(No Model.)

W. J. STEPHENSON.
WAGON BRAKE.

No. 434,612. Patented Aug. 19, 1890.

Witnesses:
E. P. Ellis,
B. Brockett,

Inventor:
Wm. J. Stephenson
per
Lehmann & Pattison,
Atty

UNITED STATES PATENT OFFICE.

WILLIAM J. STEPHENSON, OF FLORENCE, ALABAMA.

WAGON-BRAKE.

SPECIFICATION forming part of Letters Patent No. 434,612, dated August 19, 1890.

Application filed May 29, 1890. Serial No. 353,630. (No model.)

*To all whom it may concern:*

Be it known that I, WILLIAM J. STEPHENSON, of Florence, in the county of Lauderdale and State of Alabama, have invented certain new and useful Improvements in Wagon and Car Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in wagon and car brakes; and it consists in the combination and construction of parts, which will be more fully described hereinafter.

The object of my invention is to provide a brake which is adapted to be applied to either wagons or cars, and in which the parts are few and simple and not liable to get out of order while in operation.

Figure 1:
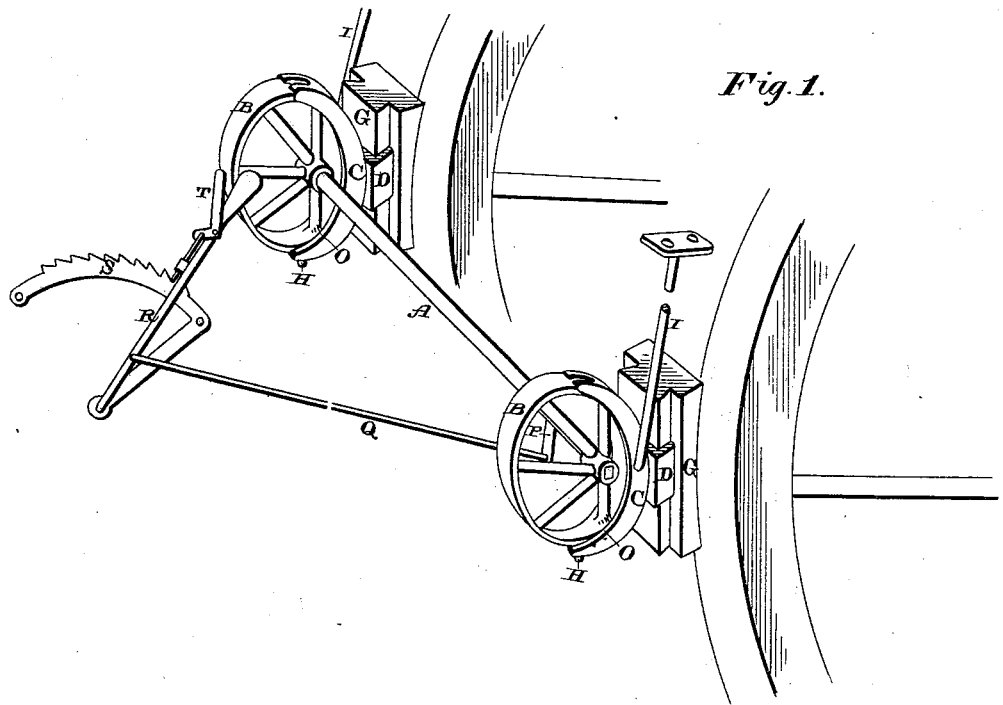
Figure 2:
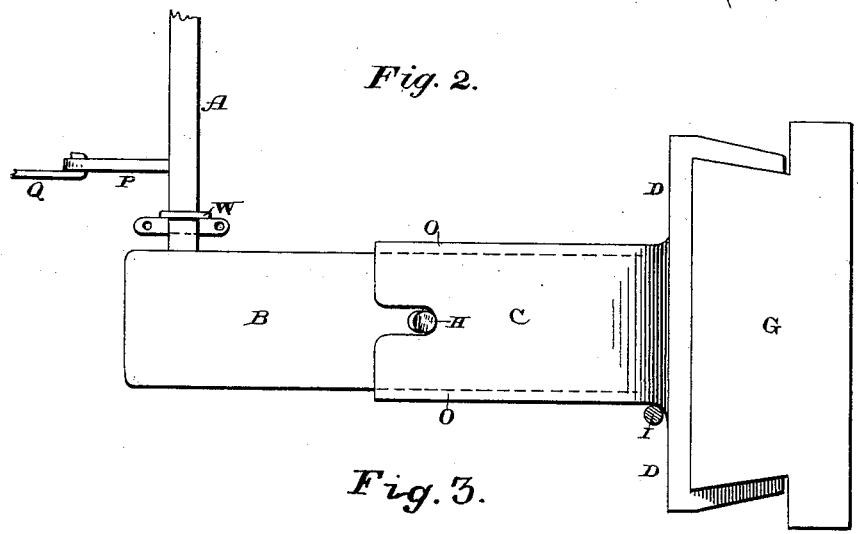
Figure 3:
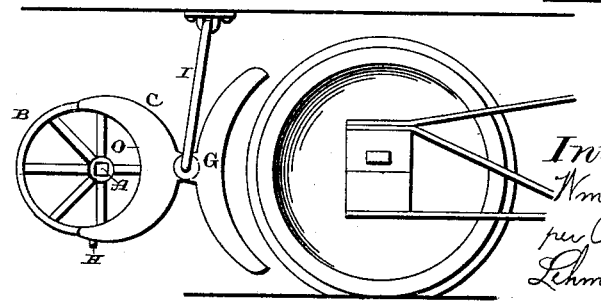

Figure 1 is a perspective of a brake which embodies my invention. Fig. 2 is a plan view of the shoe. Fig. 3 shows my brake applied to a car.

A represents the operating-shaft, which may either be journaled upon the under side of the bed of the car or wagon, or journaled upon the running-gear, as may be preferred. Secured to opposite ends of this shaft are the eccentrics B, which revolve with the shaft, and which catch against the curved flanges C of the shoes D, in which the rub-block G is held. Projecting from this shaft is an arm P, and secured to the outer end of this arm P is a rod Q, which has its outer end fastened to the operating-lever R, which moves back and forth over the curved rack S, which is secured to the side-board of the vehicle-body, and which is provided with a hand-lever T for engaging with the rack, and thus holding the lever in any desired position. By the movement of the lever R the shaft A is made to partially revolve, and thus turn the eccentrics so as to apply or withdraw the brakes. In case the brakes are to be applied to a car, a sprocket-wheel may be applied to the shaft A, and the shaft then be turned by means of a sprocket-chain, which is operated in any suitable manner.

Projecting from the periphery of each eccentric is a pin or projection H, which catches in a slot or recess made in the ends of the curved flanges of the shoe for the purpose of preventing the shoe from falling down when the brake is off, as shown in Fig. 1. The shoe is also supported and held in its proper position by means of the braces or supporting-rods I, which will have their ends secured to the under side of a wagon-bed or running-gear when attached to a wagon, but which will be secured to the truck when attached to a car.

The shaft is made to revolve through about a half-circle, and when the eccentrics are turned from the shoes the brakes are withdrawn from the wheels, and when the eccentrics are turned toward the wheels the brakes are applied. In turning through a half-circle the pin H upon the eccentric is moved out of the notch or recess in one end of the curved flange of the shoe and made to enter the other.

Each one of the shoes D is made dovetail, as shown, so as to hold the rub-block G securely, and upon the inner side of each shoe are formed flanges O, which catch over opposite edges of the eccentrics, so as to prevent the parts from becoming accidentally displaced.

The shaft A may be provided with collars W, as shown in Fig. 2, to prevent it from moving endwise, and these collars will catch against the sides of the bearings in which the shaft is journaled, either to the under side of the bed or upon the running-gear.

Having thus described my invention, I claim—

1. In a brake, the combination of the operating-shaft, the eccentrics secured thereto, and a shoe consisting of a semicircular portion having flanges which engage the side of the eccentrics, and a rubbing-surface for engaging the vehicle-wheel, substantially as described.

2. In a brake, the combination of the operating-shaft, the eccentrics secured thereto, shoes consisting of a semicircular portion which engages the eccentrics, and having slots in its ends, a rubbing-surface which engages the vehicle-wheel, and projections upon the peripheries of the eccentrics, which enter the slots in the ends of the semicircular portion of the shoe, substantially as specified.

In testimony whereof I affix my signature in presence of two witnesses.

WILLIAM J. STEPHENSON.

Witnesses:
  S. D. RICE,
  W. T. MITCHELL.